United States Patent
Kritman et al.

(10) Patent No.: US 7,316,405 B2
(45) Date of Patent: Jan. 8, 2008

(54) STAIR-CLIMBING APPARATUS

(76) Inventors: Lev Kritman, 55 Yaron Str., Qatsrin (IL) 12900; Leonid Trachtenberg, 25 Mivtza Dani Str., Rishon Le Zion (IL) 75442

( * ) Notice: Subject to any disclaimer, the term of this patent is extended or adjusted under 35 U.S.C. 154(b) by 327 days.

(21) Appl. No.: 11/203,751

(22) Filed: Aug. 15, 2005

(65) Prior Publication Data
US 2006/0037789 A1    Feb. 23, 2006

(30) Foreign Application Priority Data
Aug. 17, 2004    (IL) .................................... 163589

(51) Int. Cl.
*B62B 5/02*    (2006.01)
(52) U.S. Cl. .................... 280/5.22; 180/8.2; 180/9.32; 180/326
(58) Field of Classification Search ............... 280/5.22; 180/8.2, 907, 8.7, 9.3, 9.32, 6.7, 326
See application file for complete search history.

(56) References Cited

U.S. PATENT DOCUMENTS

| | | | |
|---|---|---|---|
| 3,166,138 A * | 1/1965 | Dunn, Jr. .................... | 180/9.23 |
| 3,288,234 A * | 11/1966 | Feliz .......................... | 180/6.5 |
| 3,529,688 A * | 9/1970 | Bruce ......................... | 180/9.23 |
| 3,869,011 A * | 3/1975 | Jensen ........................ | 180/9.23 |
| 4,401,178 A | 8/1983 | Studer | |
| 4,432,426 A | 2/1984 | Misawa | |
| 4,556,229 A | 12/1985 | Bihler et al. | |
| 4,564,080 A | 1/1986 | Pagett | |
| 4,566,550 A | 1/1986 | Misawa | |
| 4,618,155 A | 10/1986 | Jayne | |
| 4,671,369 A | 6/1987 | Tiffin et al. | |
| 4,771,839 A | 9/1988 | Misawa | |
| 4,794,999 A | 1/1989 | Hester | |
| 4,898,256 A | 2/1990 | Lehner | |
| 4,915,184 A | 4/1990 | Watkins | |
| 5,123,495 A | 6/1992 | Littlejohn et al. | |
| 5,158,309 A * | 10/1992 | Quigg ........................ | 280/5.22 |
| 5,197,558 A * | 3/1993 | Misawa ...................... | 180/8.2 |
| 5,263,547 A | 11/1993 | Alber | |
| 5,395,129 A * | 3/1995 | Kao ........................... | 280/5.22 |
| 5,423,563 A | 6/1995 | Wild | |
| 5,577,567 A | 11/1996 | Johnson et al. | |
| 6,158,536 A | 12/2000 | Misawa | |

(Continued)

*Primary Examiner*—George B. Nguyen
*Assistant Examiner*—Michael Stabley
(74) *Attorney, Agent, or Firm*—Marjama Muldoon Blasiak & Sullivan LLP

(57) ABSTRACT

An apparatus for climbing and descending stairs or other obstacles has three flexibly connected sections and a pair of crawler belt systems on opposite sides of the unit. Each of the crawler belt systems comprised of three crawler belts are driven by one of a pair of motors that directly drives a pinion that engages two of the crawler belts, one of which then drives the last crawler belt through another pinion. The stair-climbing apparatus also includes a mounting platform for coupling a carrier device such as a wheelchair or a box. In order to provide cushioning and stability for movements from a horizontal surface to an inclined surface and vice versa, shock absorbers are provided between the three sections. A linear actuator is also provided to provide stabilization as well as the ability to raise and lower both the stair-climbing crawler unit as well as the wheelchair, providing three modes of operation including manually wheel driven mode, motor wheel driven mode, and motor crawler driven mode.

19 Claims, 12 Drawing Sheets

U.S. PATENT DOCUMENTS

| | | |
|---|---|---|
| 6,237,705 B1 | 5/2001 | Nakatani et al. |
| 6,341,784 B1 | 1/2002 | Carstens |
| 6,405,816 B1 | 6/2002 | Kamen et al. |
| 6,443,251 B1 | 9/2002 | Morrell et al. |
| 6,484,829 B1 | 11/2002 | Cox |
| 6,619,414 B2 | 9/2003 | Rau |
| 6,857,490 B2 | 2/2005 | Quigg |

* cited by examiner

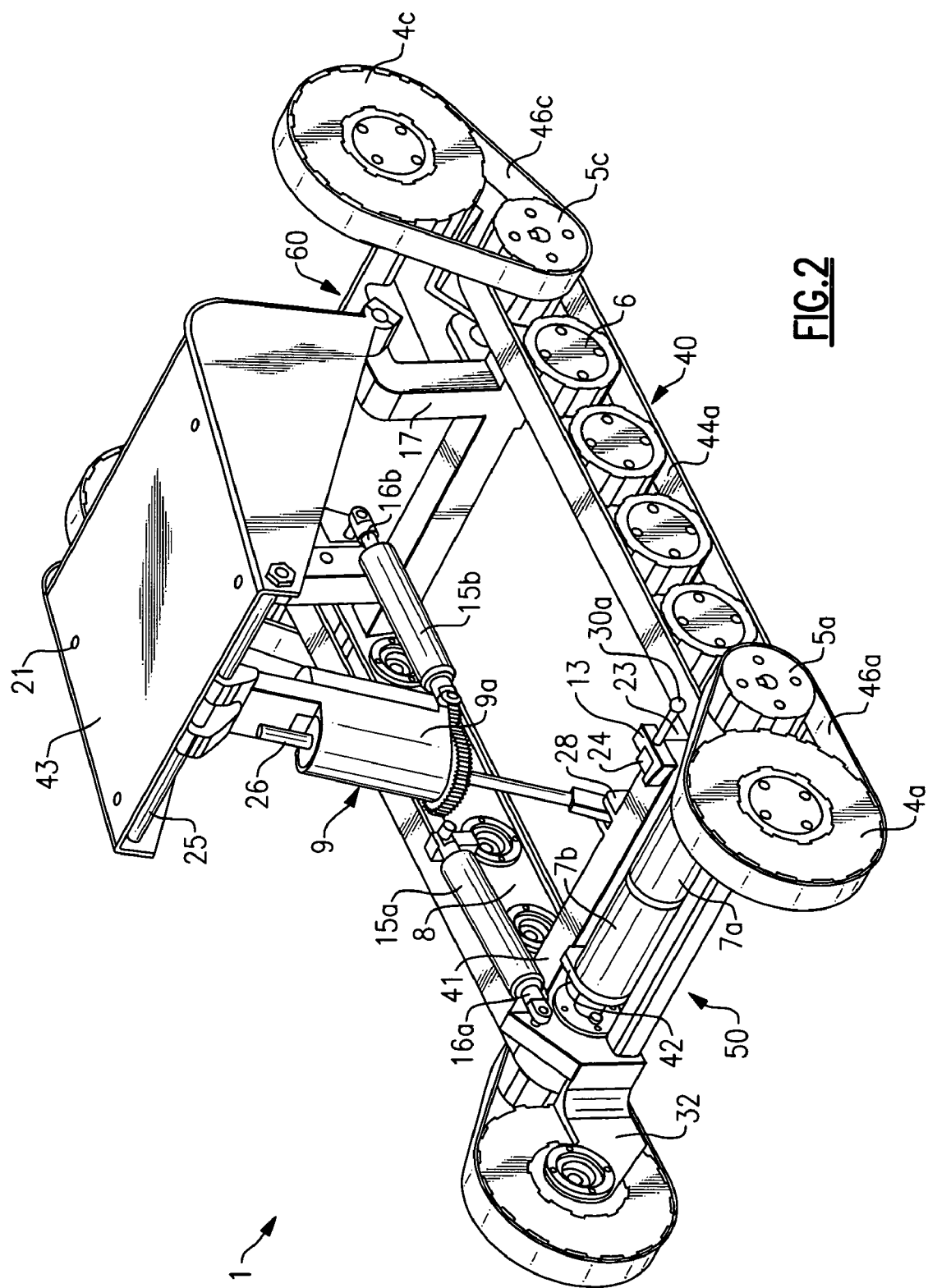

STAIR-CLIMBING APPARATUS

BACKGROUND OF THE INVENTION

1. Field of the Invention

This invention relates generally to a stair-climbing apparatus to be attached to a conventional load carrier vehicle or wheelchair to enable movement ascending and descending stairs and other obstacles such as curbs without assistance from another individual.

2. Description of the Prior Art

Stair-climbing apparatuses mounted on wheelchairs or load carrier vehicles are known.

Representative examples of stair-climbing apparatuses disclosed in reference patent documents are discussed below.

For the most part, these apparatuses are battery powered, motor driven, with a chair or platform permanently connected. These vehicles, and particularly wheelchairs, are heavy, bulky, and equipped with complicated shock absorber systems.

U.S. Pat. No. 6,619,414 discloses a personal mobility vehicle comprising a frame with a pair of parallel tracks for moving the vehicle, a lifter arm to assist the vehicle in traversing the upper end of a flight of stairs in either the ascending or descending directions, and a retractable rod with freewheeling roller to prevent the vehicle from tipping rearward as the vehicle ascends a slope.

U.S. Pat. No. 4,564,080 and U.S. Pat. No. 4,671,369 describe wheelchairs wherein a pair of cushioning arms and fluid piston and cylinder assemblies operate to avoid rapid downward movements of the front and the rear of the wheelchair as the wheelchair moves from a horizontal surface to an inclined surface or from an inclined surface to a horizontal surface. This system performs latching and unlatching the cushioning arms, respectively, when the wheelchair moves over a horizontal surface or senses proximity to an inclined surface.

The complicated systems disclosed in the above references require a suitable sensing and control mechanism.

The retractable rod (of U.S. Pat. No. 6,619,414) and cushioning arms (of U.S. Pat. No. 4,671,369) have a roller (or wheel) at the end of an arm, which engages a horizontal surface, such as a landing surface when moving down a step or curb, or rolls over a step or curb when climbing up a step or curb. The location of these cushioning arms in the interior of the wheelchair between two driving crawlers can cause accidents when the roller engages a horizontal surface and suddenly meets with a resistive element (such as a lug or a hollow) that it cannot override. In this case, since the wheelchair is being driven with tracks that continue moving ahead, the wheelchair will turn over. To prevent such a dangerous accident, a complicated sensing and control mechanism was desired.

The systems described in U.S. Pat. No. 4,564,080 and U.S. Pat. No. 4,671,369 comprise ground-engaging wheels and a pair of endless flexible tracks. Since each wheel and track is driven by individual motor, four individual motors and a suitable control is provided to allow for forward, reverse, and turning movements of the wheelchair. This system is only power-driven and is not suitable to be operated manually as a conventional wheelchair.

In the above mentioned patents, the user's chair is able to be switched between two fixed positions: 1) horizontal when the wheelchair moves on its wheels on a horizontal surface or 2) tilted backward at a fixed angle related to the frame when the wheelchair moves on the tracks up or down an inclined surface. In the latter case, the orientation of the chair relative to the horizontal surface depends on the slope of the inclined surface. So, at a certain slope, a wheelchair user may experience discomfort.

U.S. Pat. No. 4,898,256 describes a crawler unit for coupling to a wheelchair. The unit is designed to climb stairs and travel up access ramps. The crawler unit comprises power-driven tracks, fits between the main wheels of the wheelchair, and includes an adapter for securing the wheelchair in a rearward tilted traveling position in which the wheels of the wheelchair are lifted off the ground.

Due to the structure, the wheelchair user is enabled selectively to lift the crawler unit and control and manipulate the wheelchair as usual while the elevated crawler unit remains on the wheelchair.

The crawler unit comprises a shock absorber system similar to that described above. In this structure, supporting rails curved upwards like the blade tip of a cross-country or running ski are used instead of cushioning arms with a roller. This construction increases the danger of an accident if the supporting rail suddenly meets with an obstacle while landing on a horizontal surface.

In U.S. Pat. No. 4,564,080, the wheelchair is tilted backward at a fixed angle relative to the frame of the crawler unit and can cause discomfort to a wheelchair user at a certain rate of inclined slope as described above.

U.S. Pat. No. 5,158,309 describes an apparatus attached to a conventional, collapsible wheelchair so as to enable a wheelchair user to independently ascend and descend stairs and other obstacles without assistance from another individual. The stair-climbing apparatus comprises a pair of laterally spaced and aligned tread units. The tread units are split into two sections: forward and rear. Treads when lifted allow the wheelchair to be propelled on its wheels. Treads in position to engage the surface are manually driven by main wheels, which are disengaged from the ground and stairs. This structure of the apparatus does not prevent the rapid downward movement of the front and the rear of the wheelchair as the wheelchair moves from a horizontal surface to an inclined surface or from an inclined surface to a horizontal surface that can cause discomfort to a wheelchair user.

In summary, it should be emphasized that the above-mentioned power driven, stair-climbing vehicles comprise complicated mechanical and kinematic structures and also incorporate a suitable servo control system that influence a system cost, reliability, and safety.

Only some of the apparatuses described above provide manual driving and maneuvering on the wheels as a conventional wheelchair that is very important for indoor usage.

SUMMARY OF THE INVENTION

A general object of the present invention is to provide a stair-climbing crawler unit which can be coupled with a load carrier vehicle or particularly a conventional wheelchair, to provide a structure which has substantially improved maneuverability as compared with known structures.

Due to the structure of the invention, when the stair climbing unit is coupled with a wheelchair, a user can selectively switch the operation to one of three modes: manually driven wheels, motor driven wheels, or motor driven crawlers.

Another object of the present invention is to provide flexibility to the crawlers by splitting the crawlers into three sections resulting in tread guides of the separate sections that are flexibly joined by pivots while each section guide bears its own tread.

The next object of the invention is to provide a structurally simple, effective, and safe cushioning mechanism based on the flexibility of the crawlers.

One more object of the present invention is to provide vertical axis stabilization of the wheelchair or load carrier vehicle in every possible position of the vehicle related to the horizontal surface as the vehicle moves up or down a slope.

Other objects of this invention will become apparent as the following specification progresses, reference being had to the accompanying drawings for an illustration of the invention.

BRIEF DESCRIPTION OF THE DRAWINGS

FIGS. 2 and 2A present right and left perspective views, respectively, of the stair-climbing crawler unit.

DETAILED DESCRIPTION OF THE PREFERRED EMBODIMENTS

Figure 1:
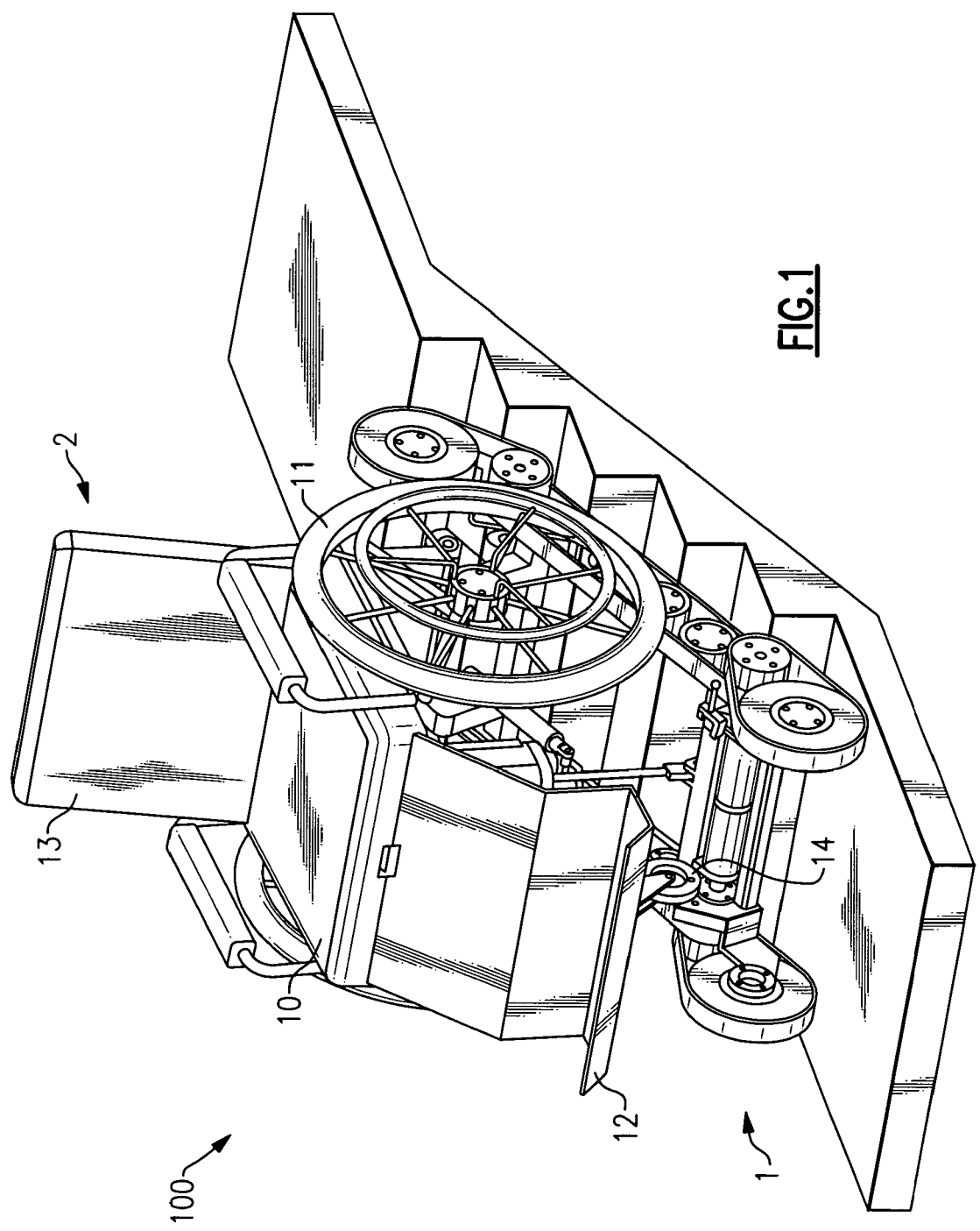
FIG. 1 presents a perspective view of an assembly of a stair-climbing crawler unit coupled to a wheelchair.

In the illustrative embodiment shown in FIG. 1, the assembly 100 is composed of a stair-climbing crawler unit 1 and a conventional wheelchair 2.

The wheelchair 2 includes a seat portion 10 with a back rest 13, a foot rest 12, main wheels 11, and a supporting wheel 14.

Figure 2A:
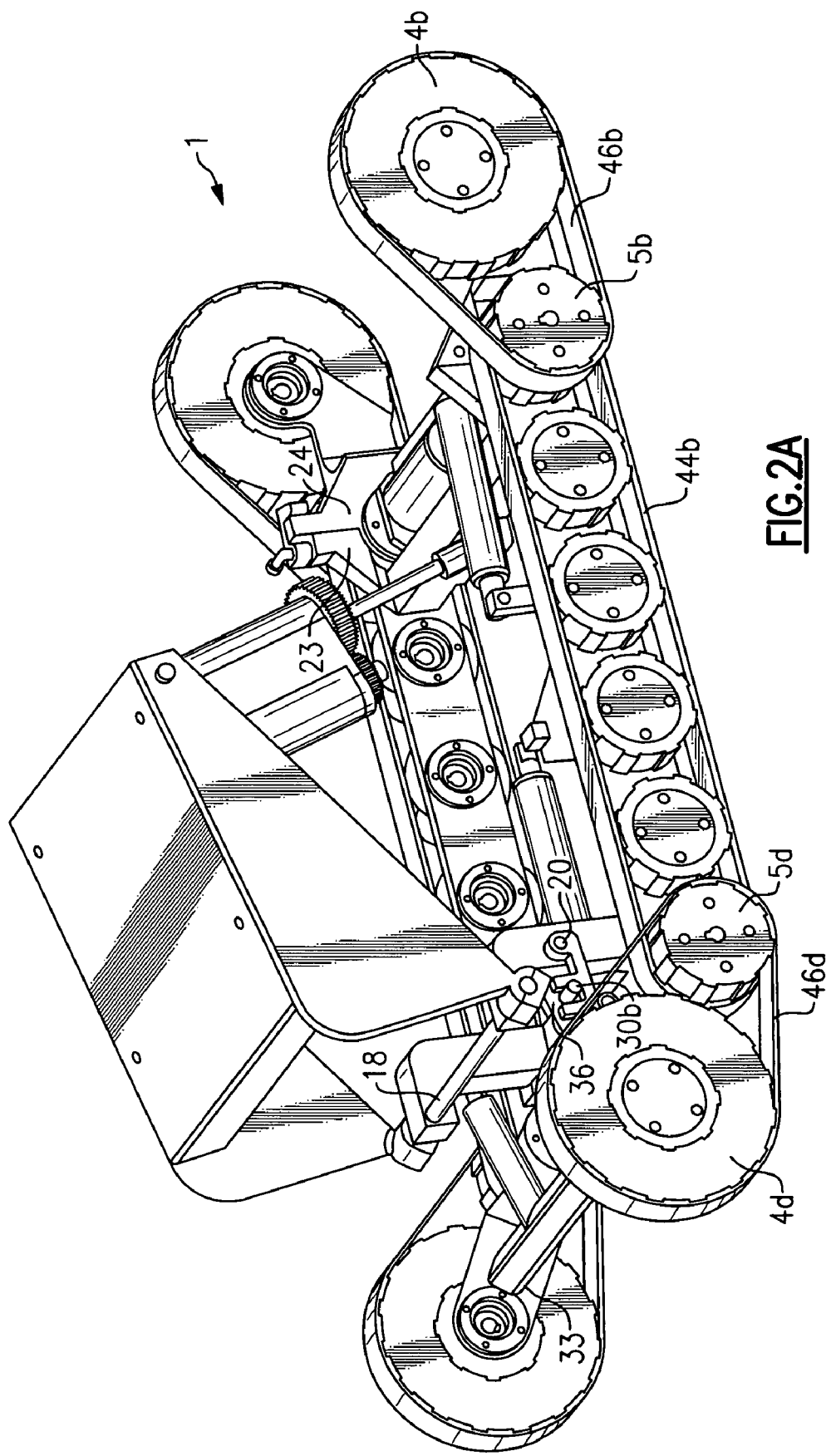

Referring to FIG. 2 and FIG. 2A the stair-climbing crawler unit 1 comprises a main section 40, a front section 50, and a rear section 60. The main section 40 includes a guide frame 8 with two supports 17 which support an axle 18 (FIG. 2A). A platform 43 pivotally rests on the axle 18. Four holes 21 of the platform 43 are used to fasten the wheelchair 2 as it appears in the preferred embodiment (FIG. 1). The body 9a of a linear actuator 9 is flexibly connected with the shaft 25 at the front of the platform 43. The ram 26 of the linear actuator 9 is connected by a pivot 28 to the cross bar 41 of the guide frame 8. So, linear movement of the ram 26 rotates the platform 43 on the axle 18. A left motor 7a and right motor 7b are mounted on side support plates 42 at front of the guide frame 8. Two double drive pinions are located at the left side of the guide frame 8 at the front 5a and rear 5c. Two double drive pinions are located at right side of the guide frame 8 at the front 5b and rear 5d. At the front of guide frame 8, left double drive pinion 5a is keyed with the stub drive shaft of left motor 7a. Similarly, right double drive pinion 5b is keyed with the stub drive shaft of right motor 7b. At the rear of guide frame 8, the left and right double drive pinions 5c and 5d are free rotating on their axles (not shown). Motor 7a, by front left double drive pinion 5a, drives left flexible crawler belt 46a of the front section and left main flexible crawler belt 44a. The left main flexible crawler belt 44a, through rear left double drive pinion 5a, drives the left flexible crawler belt 46c of the rear section. Similarly, motor 7b, by front right double drive pinion 5b, drives right flexible crawler belt 46b of the front section and right main flexible crawler belt 44b. The right main flexible crawler belt 44b, through rear right double drive pinion 5d, drives the right flexible crawler belt 46d of the rear section. The flexible crawler belts have internal gear teeth and external tread cleats. The main flexible crawler belts 44a and 44b are supported by a set of conventional idler pulleys 6 that are free rotating on their axles mounted on the side plates of the guide frame 8.

The axles (not shown) of the double drive pinions 5a and 5b at the front bear the frame 32 of the front crawler section 50. The axles (not shown) of the double drive pinions 5c and 5d at the rear bear the frame 33 (FIG. 2A) of the rear section 60.

So, the front section 50 with flexible crawler belts 46a and 46b and the rear section 60 with flexible crawler belts 46c and 46d are able to swing on the support bearings.

The front crawler section 50 is equipped with special pulleys of enlarged diameter on the left 4a and right 4b sides of the frame 32 in order to form an upwardly-sloping flight of crawler shape. The rear crawler section 60 is also equipped with enlarged diameter pulleys on the left 4c and right 4d sides of the frame 33.

The motors 7a and 7b are powered by a battery carried on the wheelchair. Conventional controls (not shown) are provided so that the motors may be operated together in forward or reverse, individually, and/or oppositely for steering purposes.

The angle of displacement of the front section 50 is limited by stopper 23 on the guide frame 8 and a lug 24 on the frame 32 of the front section 50. The angle of displacement of the rear section 60 is limited by support 17 on the guide frame 8 and lug 36 on the frame 33 (FIG. 2A) of the rear section 60. The lock 13 and pin 30a placed on the lug 24 are used for latching the front section 50. The lock 20 and pin 30b placed on the lug 36 are used for latching the rear section 60. The lock 20 has two grooves to enable latching the rear section 60 in one of two possible positions. The front section 50 and rear section 60 can be released by opening locks 13 and 20.

A front shock absorber 15a is connected between the guide frame 8 and the front section frame 32, which is pivotally connected with the piston rod 16a of the front shock absorber 15a, which comprises a one way dampening system and a spring return mechanism to the unengaged position. Similarly, a rear shock absorber 15b is connected between the guide frame 8 and the rear section frame 33, which is pivotally connected with the piston rod 16b of the rear shock absorber 15b.

Figure 3:
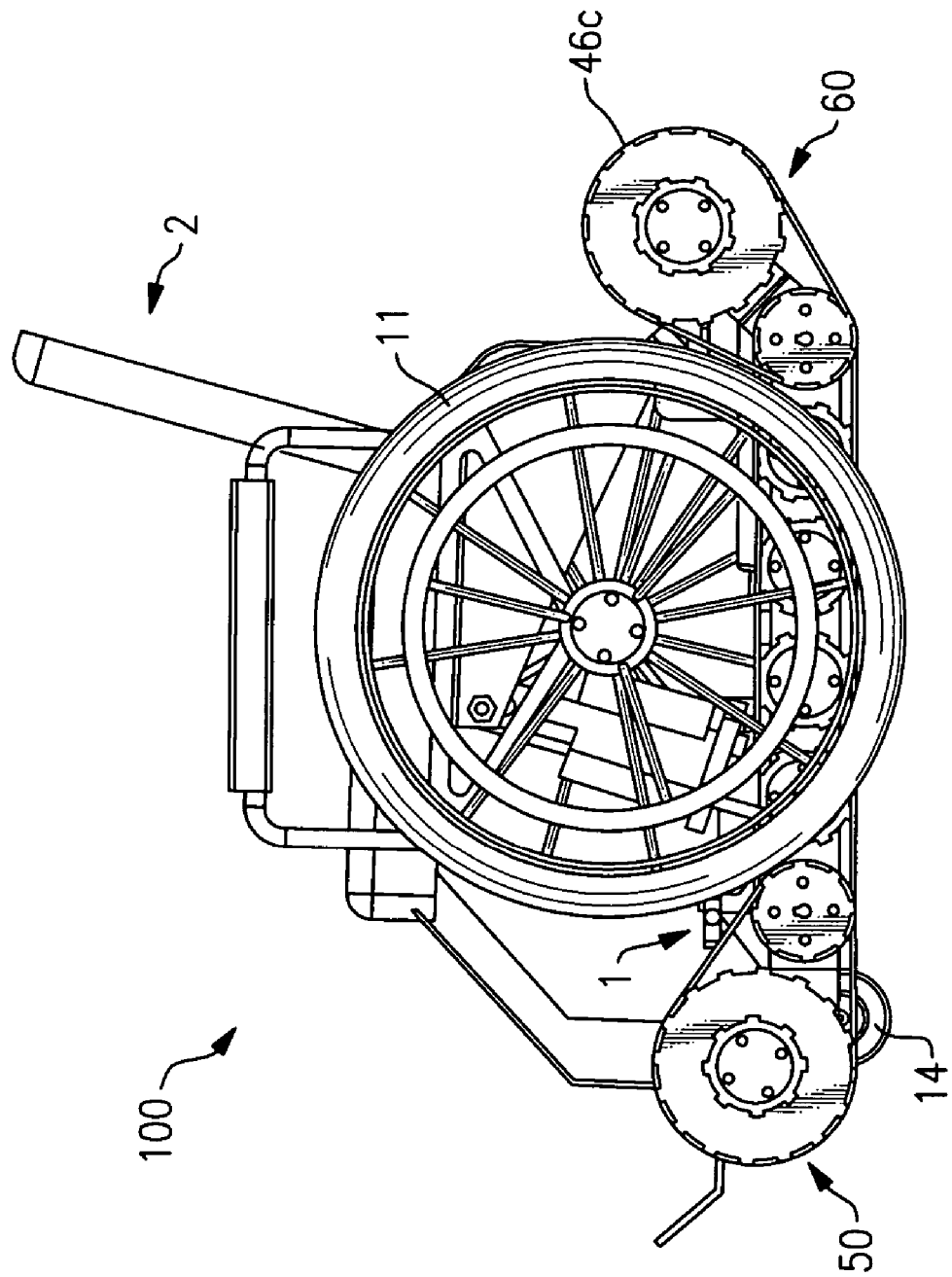
FIG. 3 presents the assembly in manually wheel driven mode of operation.

Referring to FIG. 3, the assembly 100 of the preferred embodiment is presented in the manually wheel driven mode of operation as a conventional wheelchair 2. The assembly 100 is rested on the horizontal surface (floor or ground) on its wheels 11 and 14. The stair-climbing crawler unit 1 are lifted above the surface. The front section 50 and the rear section 60 are latched. The rear section 60 is latched in the first position, so that the main wheels 11 and rear flexible crawler belts 46c and 46d (not shown) do not touch each other. Accordingly, a user of the wheelchair is able to control it manually.

Figure 4:
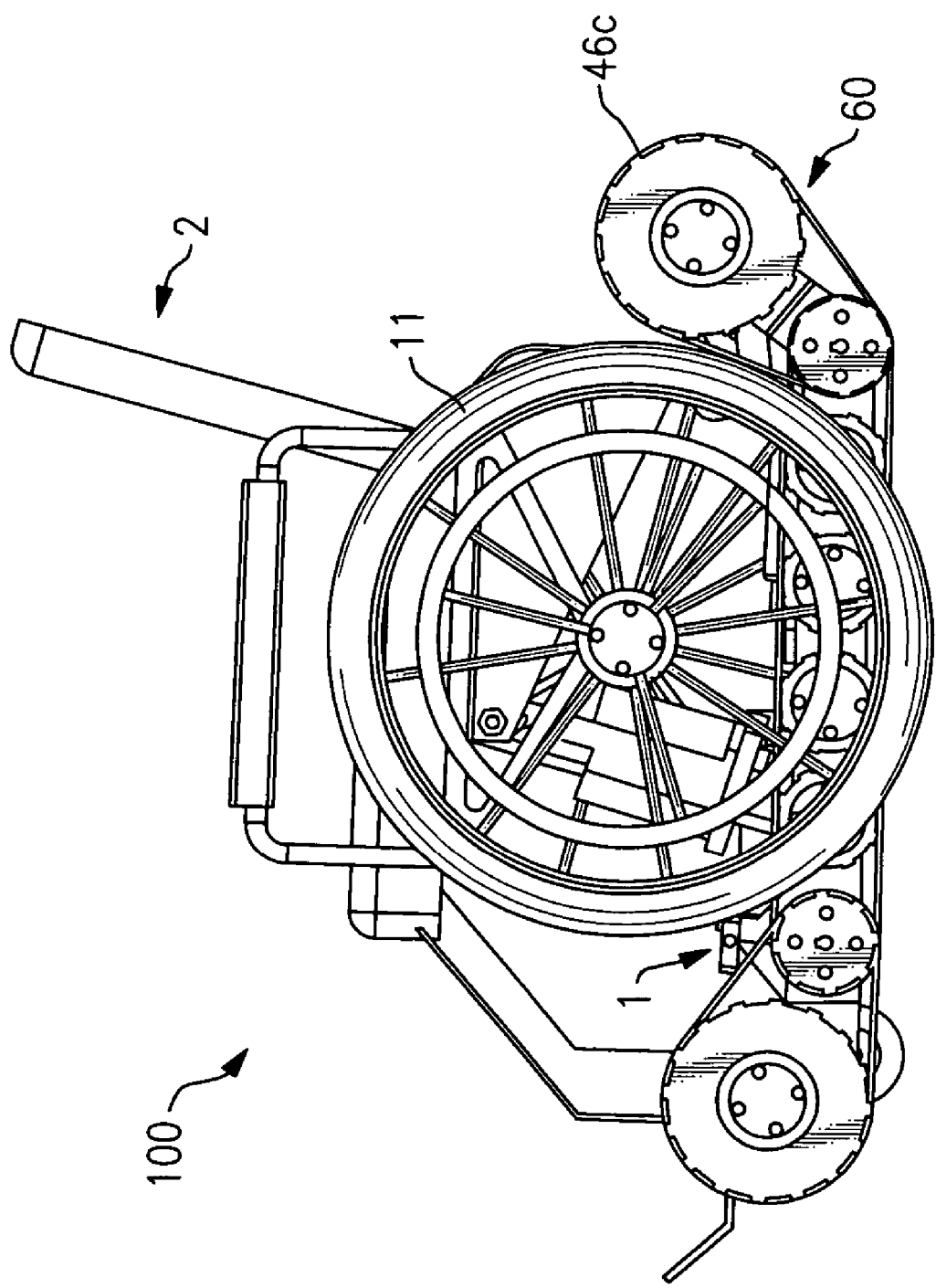
FIG. 4 presents the assembly in motor wheel driven mode of operation.

Referring to FIG. 4, the assembly 100 of the preferred embodiment is presented in the motor wheel driven mode of operation as a wheelchair 2 with motor driven wheels. This mode of operation is similar to the previous mode shown in FIG. 3 but the rear section 60 is latched in a second position wherein the rear flexible crawler belts 46c and 46d (not shown) contact the main wheel 11 and form a friction gear.

Switching the rear section 60 between the first and second positions can be performed ether by a manual arm or by an electronic controller like a joystick or touch button keyboard with a display (not shown) placed on the armrest of the chair. The mode of motor wheel driven operation is useful, for example, in assisting the user to travel a long distance on a flat or sloped surface.

Figure 5:
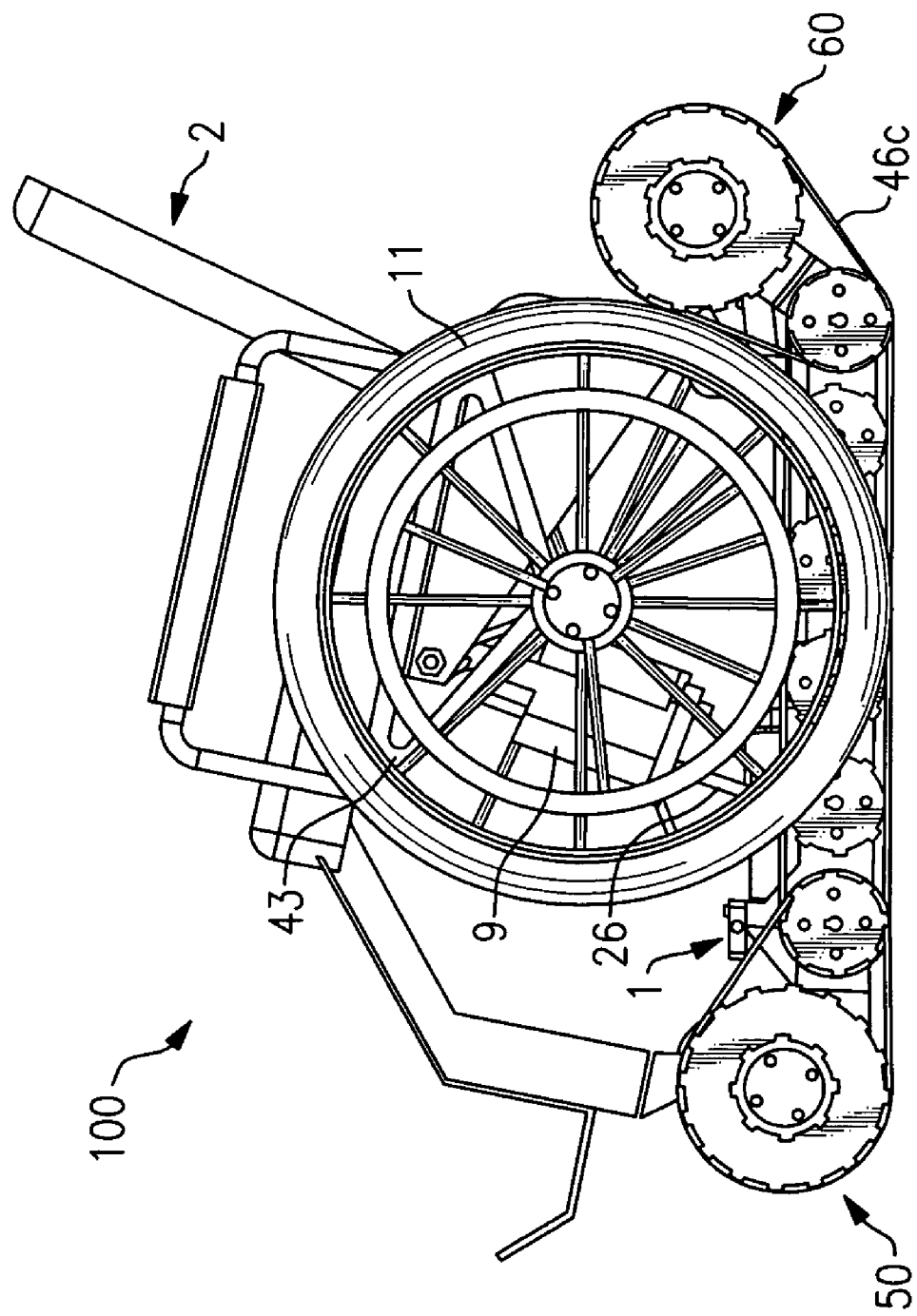
FIG. 5 presents the assembly in motor crawler driven mode of operation.

Referring to FIG. 5, the assembly 100 of the preferred embodiment is presented in the motor crawler driven operation mode in which the crawlers engage the surface (floor or ground). The crawlers are shifted to this position by activating the linear actuator 9. The ram 26 of the actuator 9 lowers the crawlers down until they engage the surface after which the ram 26 of the actuator 9 lifts the wheelchair 2 with the platform 43. The lock 13 (FIG. 2) of the front section 50 is opened and the front crawler section 50 is released. The rear section 60 is latched by lock 20 (FIG. 2A) in the first position. The assembly 100 is ready to climb stairs.

Figure 6:
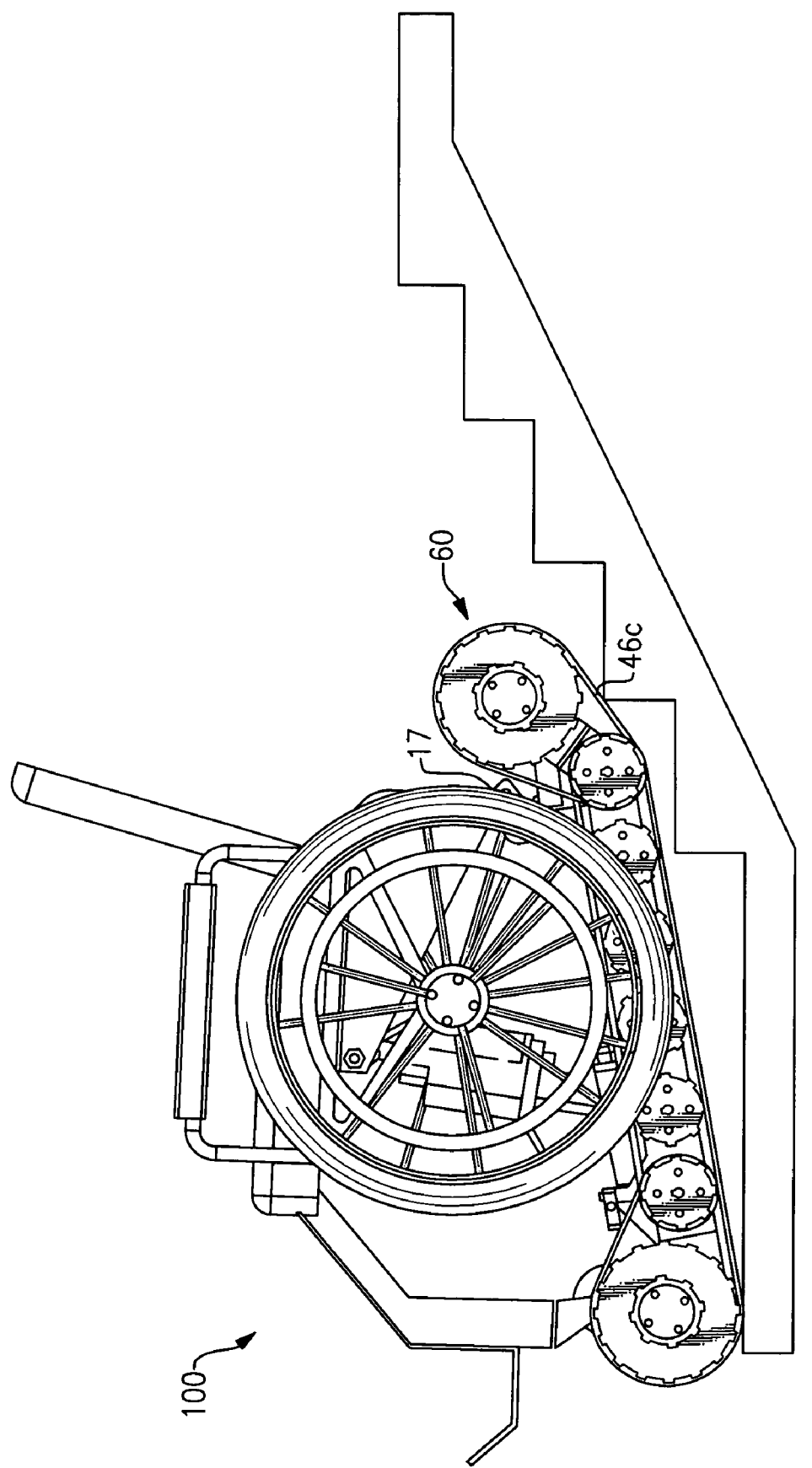
FIG. 6 presents the assembly beginning the process of climbing stairs.

Referring to FIG. 6, the assembly 100 is presented at the beginning of its ascent up stairs.

When the assembly 100 moving backwards meets the first stair, the rear section 60, which has been released at this stage, turns counterclockwise until the lug 36 (FIG. 2A) meets the supports 17. At this point, the flexible crawlers 46c and 46d (not shown) begin ascending the stairs.

Figure 7:
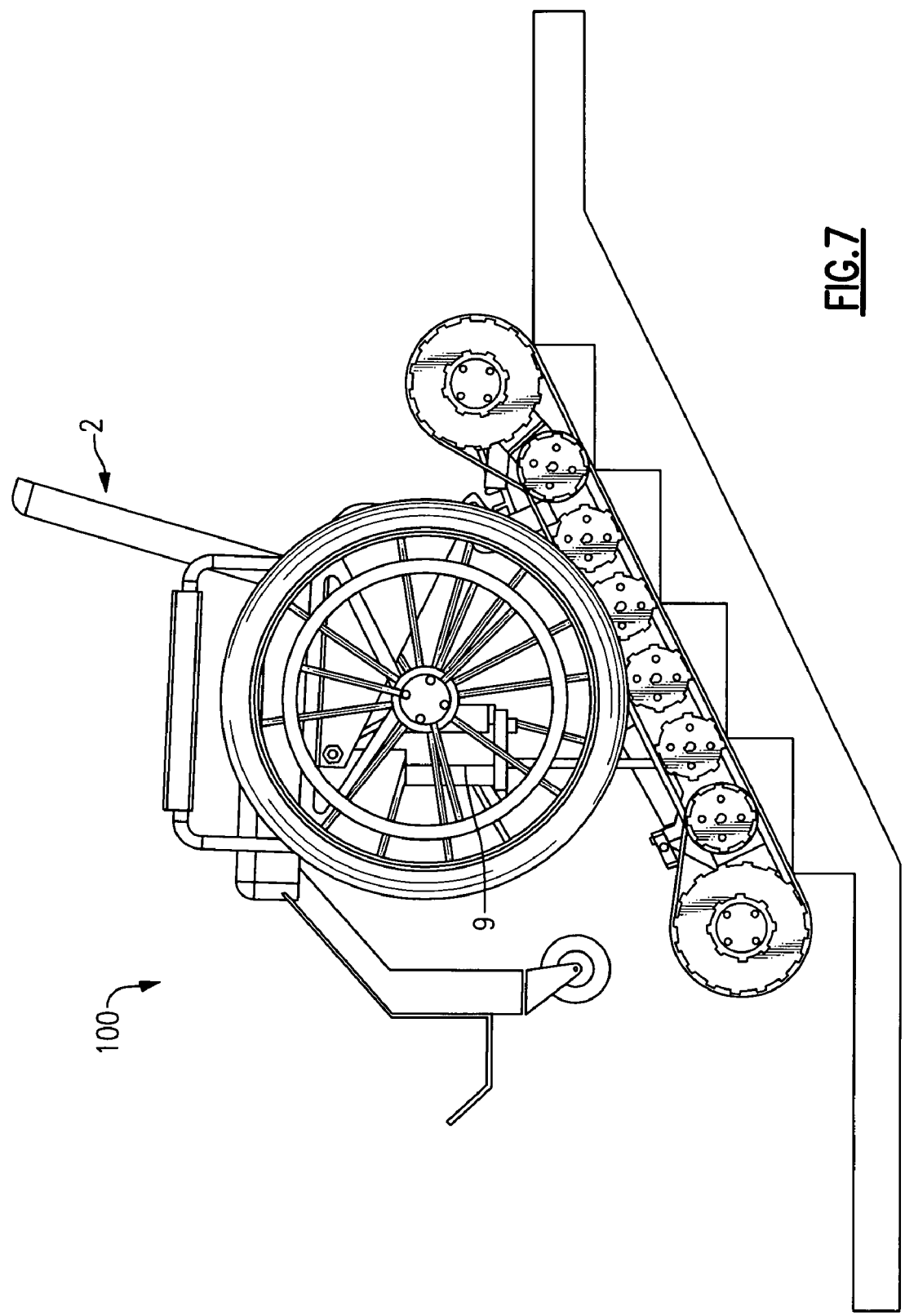
FIG. 7 presents the assembly climbing stairs.

Referring to FIG. 7, the assembly 100 is presented climbing stairs. The wheelchair 2, while moving along an inclined surface, is stabilized in a horizontal position by actuator 9, which is activated by an automatic follow up control system equipped with an appropriate sensor and servo motor.

Figure 8:
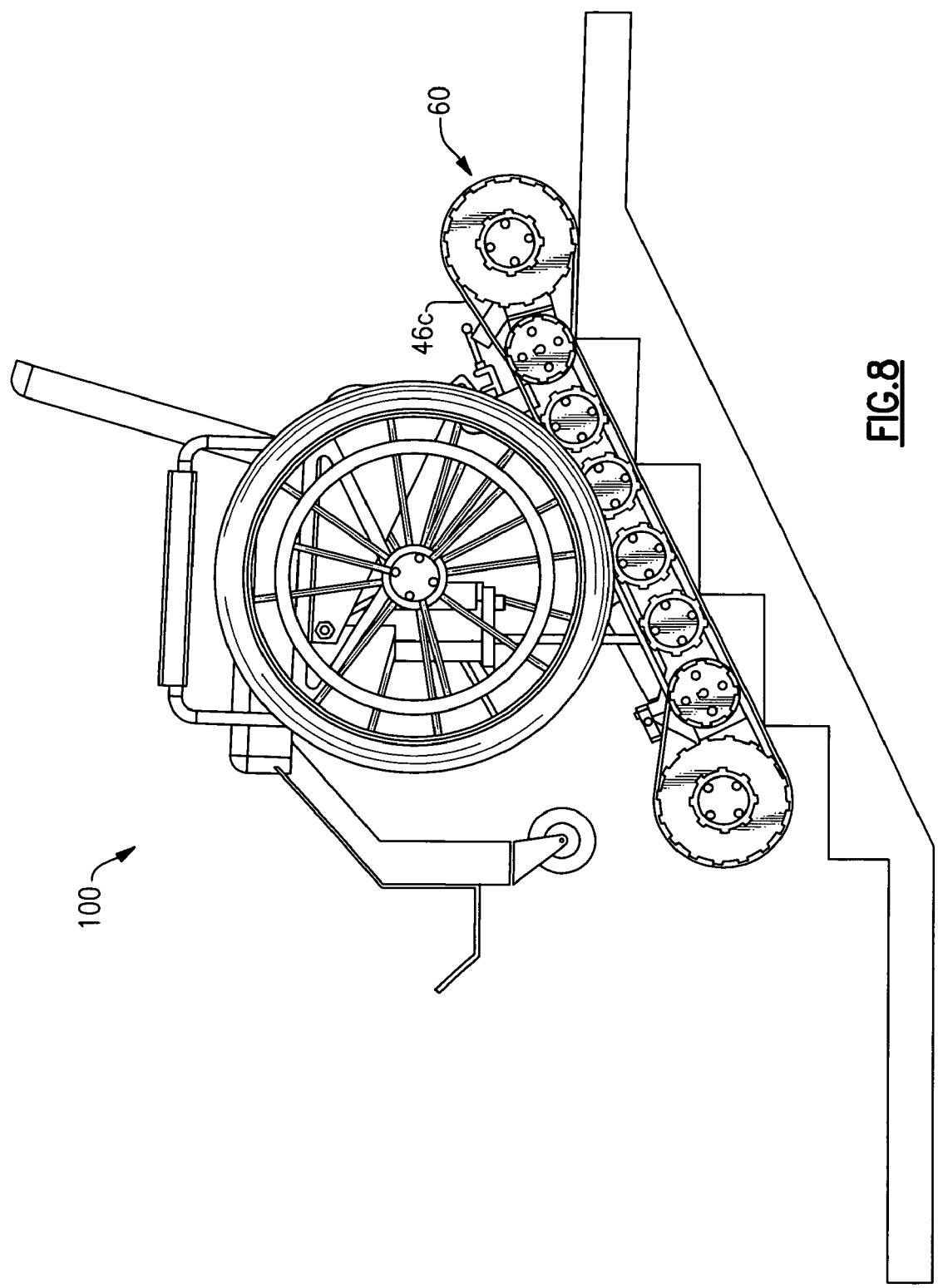
FIG. 8 presents the assembly climbing stairs and beginning the transition from an inclined surface to a horizontal surface.

Referring to FIG. 8 the assembly 100 is presented at a point where the rear crawler section 60 has reached the horizontal surface. The spring mechanism of shock absorber 15b (FIG. 2) turns the rear section 60 clockwise so the flexible crawlers 46c and 46d (not shown) of the rear section 60 engage the horizontal surface.

Figure 9:
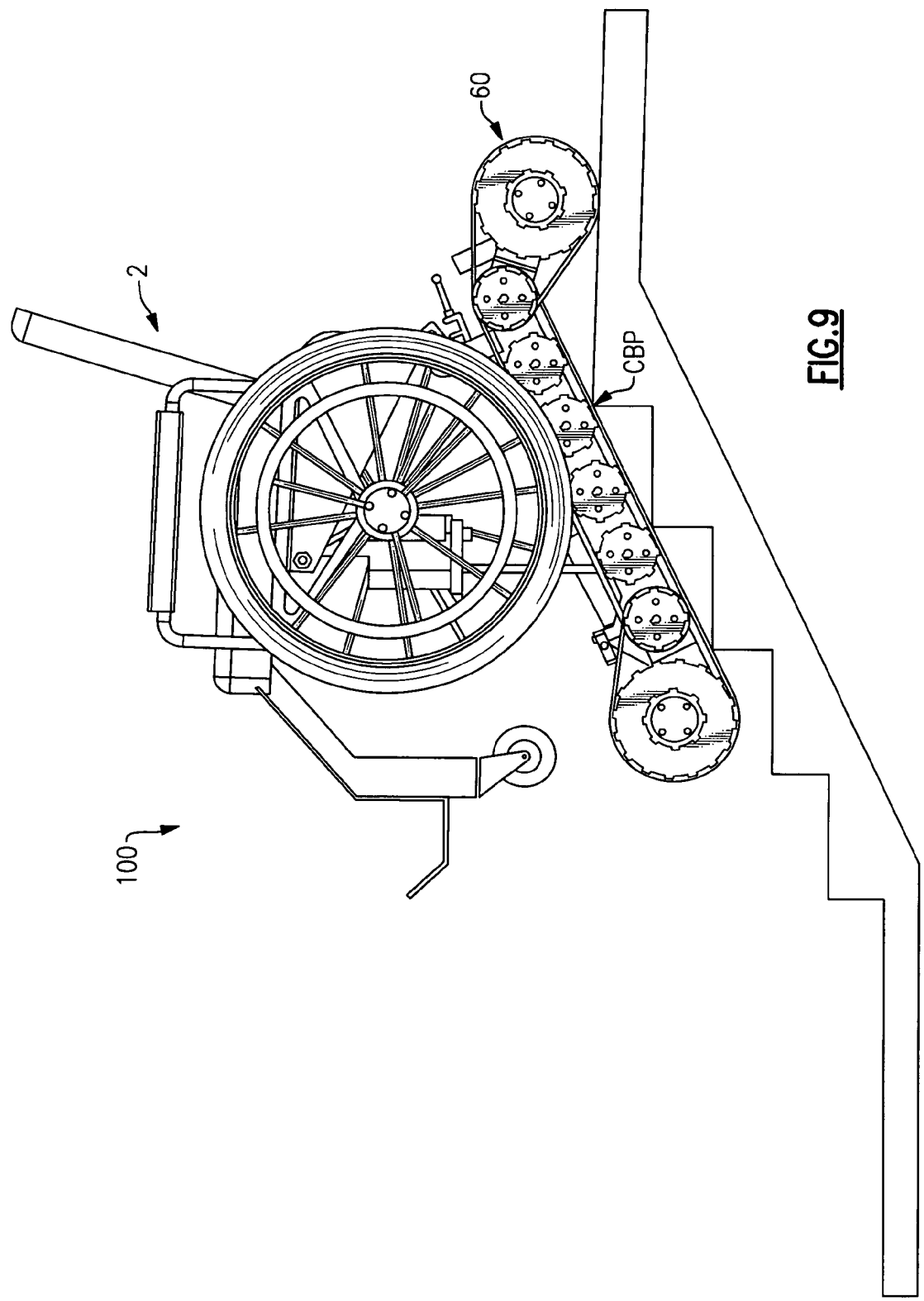
FIG. 9 presents the assembly climbing stairs at a point where the center of gravity of the assembly has not yet passed the critical point.

Referring to FIG. 9, the assembly 100 is presented climbing stairs at a point where the center of gravity of the assembly 100 has not yet passed the critical break point (CBP). In this position, the rear section 60 is turned clockwise by the spring mechanism of the shock absorber 15b (FIG. 2). The point where the stair-climbing crawler unit 1 touches the horizontal surface supports the main section 40.

Figure 11:
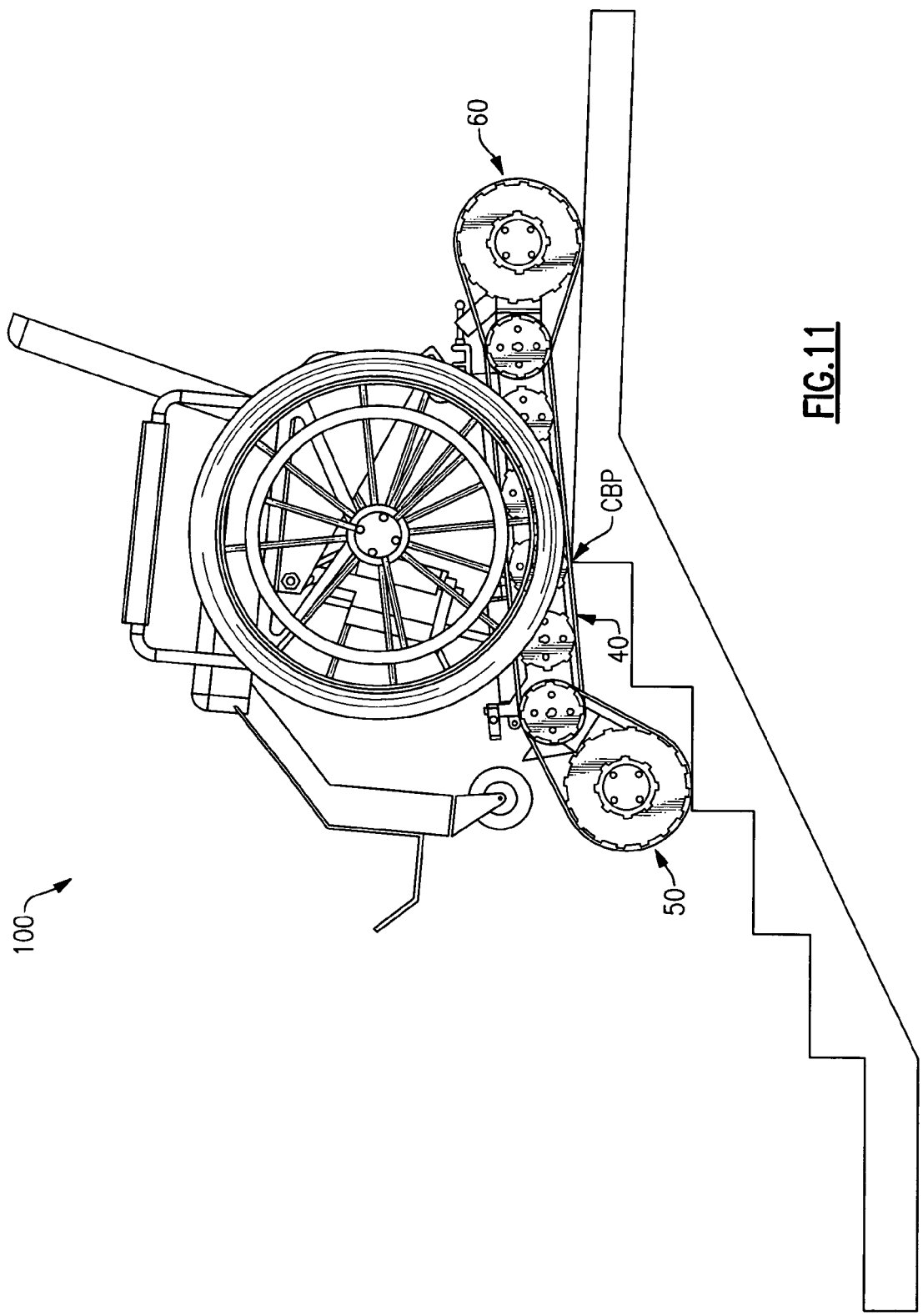
FIG. 11 presents the assembly climbing stairs (or descending stairs) at the point where the center of gravity of the assembly is crossing the critical point.

Referring to FIG. 11, the assembly 100 is presented climbing stairs at the point where the center of gravity of the assembly 100 is crossing the critical break point (CBP). The rear section 60 under the weight of the user and the wheelchair 2 will turn counterclockwise against the shock absorber 15b (FIG. 2) and continue supporting the main section 40 and providing a gentle landing on the horizontal surface. The shock absorber 15a (FIG. 2) of the front section 50 performs the same cushioning function and supports the main section 40 at the front.

Figure 10:
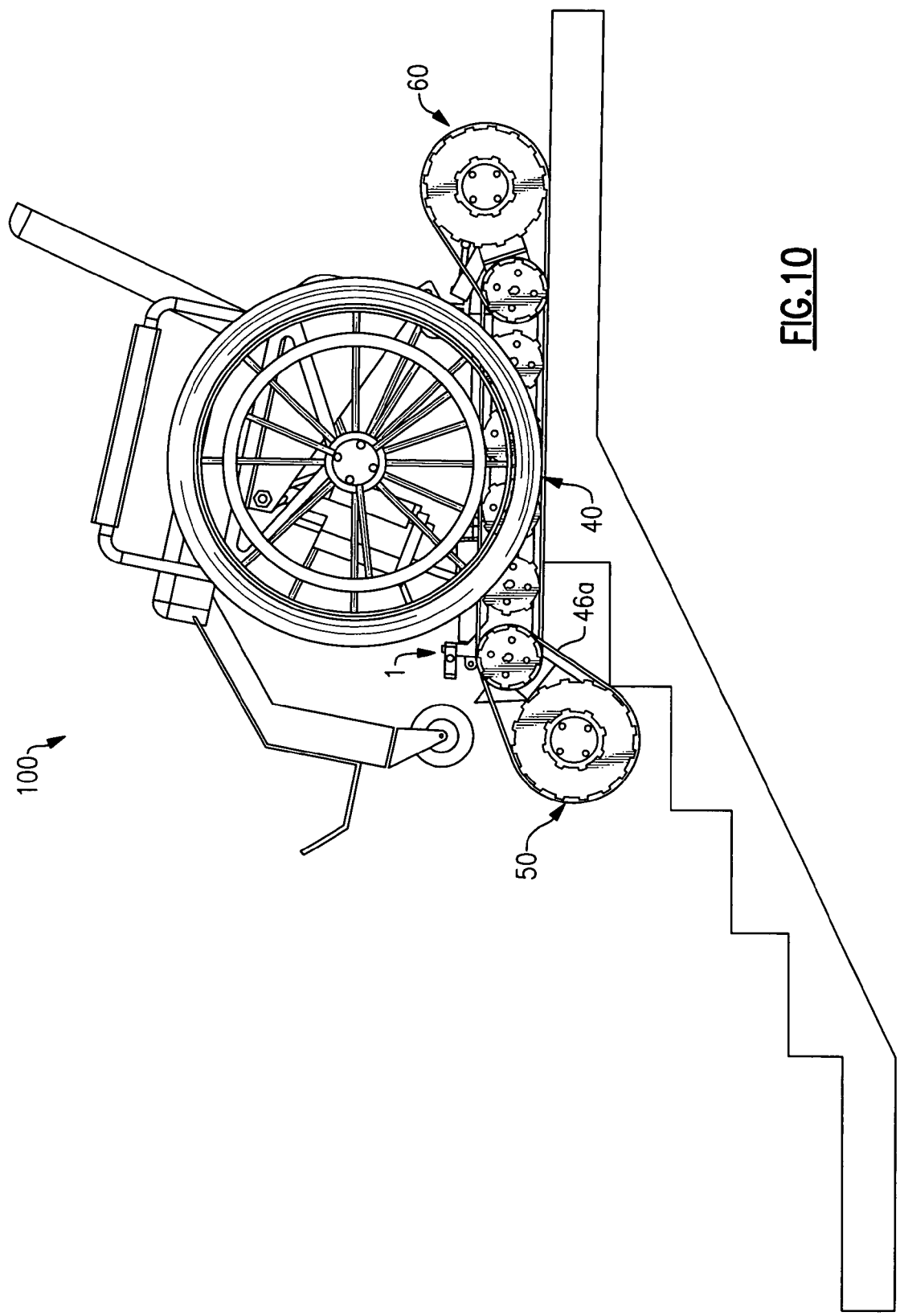
FIG. 10 presents the assembly climbing stairs at a point where the center of gravity of the assembly has already passed the critical point.

Referring to FIG. 10, the assembly 100 is presented at the point where it begins descending stairs. At this point, the front section 50 has not yet passed the critical break point (CBP). The spring of shock absorber 15a (FIG. 2) turns the front section 50 counterclockwise so that the flexible crawlers 46a and 46b (not shown) are moving along the stairs supporting the front of the main section 40. When the center of gravity of the assembly 100 passes the critical break point (CBP), the front section 50, under the weight of the wheelchair turns clockwise against the shock absorber 15a (FIG. 2). The main crawler section 40 will gently land on the descending surface. This situation is similar to the situation presented by FIG. 9 and described above. When the assembly 100 has landed on the horizontal surface, the rear section 60 begins turning counterclockwise against shock absorber 15b (FIG. 2), which performs its cushioning function. This process is similar to that presented by FIG. 6 and described above.

In comparison to the prior art, where a cushioning arm with a passive roller is used, the flexibility of the crawlers, which are driven by motors, improve safety and reliability of the assembly 100 while moving either on the stairs or on the ground even if it suddenly meets with a resistive element (such as a lug or a hollow).

Referring to above description, the assembly 100 is described as being directed rearward to go up stairs. In this case, a user's back faces the stairs. But the structure of the preferred embodiment provides climbing stairs face forward as well because the crawler unit structure comprises similar front 50 and rear 60 sections (FIGS. 2 and 2A).

The stair-climbing crawler unit disclosed in the present invention can be coupled with any other conventional vehicle, or some case or basket that can be mounted on its platform 43 (FIGS. 2 and 2A), to create the assembly 100 for lifting and lowering a heavy load along a stair well.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An apparatus for climbing and descending stairs or other obstacles, said apparatus comprising:
    a first section including a first section frame and a pair of first pulleys disposed on opposite sides of said first section frame;
    a second section including a second section frame and a pair of second pulleys disposed on opposite sides of said second section frame;
    a third section flexibly connected between said first section and said second section and including a third section frame, a mounting platform for coupling a carrier device, a pair of motors disposed within said third section frame, a pair of first pinions disposed on opposite sides of said third section frame wherein each said first pinion is connected to and driven by one of said motors, and a pair of second pinions disposed on opposite sides of said third section frame; and
    a pair of crawler belt systems disposed on opposite sides of said apparatus, each of said opposite sides of said apparatus including a first crawler belt engaging said first pulley and said first pinion, a second crawler belt engaging said second pulley and said second pinion, and a third crawler belt engaging said first pinion and said second pinion, and wherein one of said motors drives said first pinion causing movement of said first and third crawler belts engaging said first pinion and thereby causing movement of said second crawler belt engaging said second pinion that is driven by said third crawler belt.

2. The apparatus of claim 1, further comprising a first shock absorber flexibly connected between said first section frame and said third section frame and a second shock absorber flexibly connected between said second section frame and said third section frame, said shock absorbers each including a spring return mechanism in one direction and a dampening system in the opposite direction.

3. The apparatus of claim 1, wherein said third section further comprises a linear actuator connected between said mounting platform and said third section frame.

4. The apparatus of claim 1, wherein said first and second pinions each comprise a double drive pinion for engaging two of said crawler belts.

5. The apparatus of claim 1, wherein said pair of motors and said pair of first pinions are located on the same horizontal axis.

6. The apparatus of claim 1, further comprising a battery for providing power to said motors.

7. The apparatus of claim 1, further comprising motor controls for operating said motors.

8. The apparatus of claim 1, wherein said crawler belts include interior gear teeth for engaging said first and second pinions and exterior tread cleats for contacting a surface to be traveled upon.

9. The apparatus of claim 1, wherein said pairs of first and second pulleys are substantially larger in diameter than said pairs of first and second pinions.

10. The apparatus of claim 1, wherein said third section further comprises a pair of third pulleys disposed on opposite sides of said third section frame and located between said pair of first pinions and said pair of second pinions.

11. The apparatus of claim 1, further comprising a wheelchair coupled to said mounting platform, said wheelchair including a seat and main wheels.

12. The apparatus of claim 1, further comprising a load carrying case coupled to said mounting platform.

13. An apparatus for climbing and descending stairs or other obstacles, said apparatus comprising:
a stair-climbing crawler unit including
a first section including a first section frame and a pair of first pulleys disposed on opposite sides of said first section frame;
a second section including a second section frame and a pair of second pulleys disposed on opposite sides of said second section frame;
a third section flexibly connected between said first section and said second section and including a third section frame, a mounting platform for coupling a wheelchair, a pair of motors disposed within said third section frame, a pair of first pinions disposed on opposite sides of said third section frame wherein each said first pinion is connected to and driven by one of said motors, and a pair of second pinions disposed on opposite sides of said third section frame;
a pair of crawler belt systems disposed on opposite sides of said apparatus, each of said opposite sides of said apparatus including a first crawler belt engaging said first pulley and said first pinion, a second crawler belt engaging said second pulley and said second pinion, and a third crawler belt engaging said first pinion and said second pinion, and wherein one of said motors drives said first pinion causing movement of said first and third crawler belts engaging said first pinion and thereby causing movement of said second crawler belt engaging said second pinion that is driven by said third crawler belt; and
a linear actuator connected between said mounting platform and said third section frame; and
a wheelchair coupled to said mounting platform and including a seat and main wheels.

14. The apparatus of claim 13, wherein said stair-climbing crawler unit is located between said main wheels of said wheelchair.

15. The apparatus of claim 13, further comprising a first shock absorber flexibly connected between said first section frame and said third section frame and a second shock absorber flexibly connected between said second section frame and said third section frame, said shock absorbers each including a spring return mechanism in one direction and a dampening system in the opposite direction.

16. The apparatus of claim 13, wherein said apparatus is configured to contact a surface to be traveled upon with said main wheels of said wheelchair by causing said linear actuator to lift said stair-climbing crawler unit above said surface.

17. The apparatus of claim 16, further comprising a latching mechanism for latching said apparatus in a position wherein said main wheels of said wheelchair contact said crawler belt systems and are driven by said motors.

18. The apparatus of claim 13, wherein said apparatus is configured to contact a surface to be traveled upon with said stair-climbing crawler unit and be driven by said motors by causing said linear actuator to lower said stair-climbing crawler unit to contact said surface and then lifting said main wheels of said wheelchair above said surface.

19. An apparatus for climbing and descending stairs or other obstacles, said apparatus comprising:
a first section including a first section frame and a pair of first pulleys disposed on opposite sides of said first section frame;
a second section including a second section frame and a pair of second pulleys disposed on opposite sides of said second section frame;
a third section flexibly connected between said first section and said second section and including a third section frame, a mounting platform for coupling a carrier device, a pair of motors disposed within said third section frame, a pair of first pinions disposed on opposite sides of said third section frame wherein each said first pinion is connected to and driven by one of said motors, and a pair of second pinions disposed on opposite sides of said third section frame;
a pair of crawler belt systems disposed on opposite sides of said apparatus, each of said opposite sides of said apparatus including a first crawler belt engaging said first pulley and said first pinion, a second crawler belt engaging said second pulley and said second pinion, and a third crawler belt engaging said first pinion and said second pinion, and wherein one of said motors drives said first pinion causing movement of said first and third crawler belts engaging said first pinion and thereby causing movement of said second crawler belt engaging said second pinion that is driven by said third crawler belt;
a first shock absorber flexibly connected between said first section frame and said third section frame and a second shock absorber flexibly connected between said second section frame and said third section frame, said shock absorbers each including a spring return mechanism in one direction and a dampening system in the opposite direction; and
a linear actuator connected between said mounting platform and said third section frame.

* * * * *